United States Patent
Nakamura et al.

(10) Patent No.: US 11,774,305 B2
(45) Date of Patent: Oct. 3, 2023

(54) MAGNETOSTRICTIVE TORQUE SENSOR AND DESIGN METHOD OF THICKNESS OF MAGNETIC RING FOR MAGNETOSTRICTIVE TORQUE SENSOR

(71) Applicants: Hitachi Metals, Ltd., Tokyo (JP); NSK Ltd., Tokyo (JP)

(72) Inventors: Teruyuki Nakamura, Tokyo (JP); Yuta Sugiyama, Tokyo (JP); Yiming Jin, Tokyo (JP); Kota Fukuda, Shizuoka (JP)

(73) Assignees: PROTERIAL, LTD., Tokyo (JP); NSK LTD., Tokyo (JP)

( * ) Notice: Subject to any disclaimer, the term of this patent is extended or adjusted under 35 U.S.C. 154(b) by 0 days.

(21) Appl. No.: 17/562,469

(22) Filed: Dec. 27, 2021

(65) Prior Publication Data
US 2022/0244118 A1 Aug. 4, 2022

(30) Foreign Application Priority Data
Jan. 29, 2021 (JP) .................................. 2021-013906

(51) Int. Cl.
*G01L 3/00* (2006.01)
*G01L 3/10* (2006.01)

(52) U.S. Cl.
CPC .................................... *G01L 3/102* (2013.01)

(58) Field of Classification Search
CPC .............. G01L 3/10; G01L 3/102; G01B 7/14
See application file for complete search history.

(56) References Cited

U.S. PATENT DOCUMENTS

| | | | | |
|---|---|---|---|---|
| 4,817,444 A | * | 4/1989 | Yagi | ........................ G01L 3/102 |
| | | | | 73/DIG. 2 |
| 2021/0074905 A1 | * | 3/2021 | Sugiyama | ............... G01K 7/203 |
| 2021/0278296 A1 | * | 9/2021 | Sugiyama | ............... G01L 3/103 |
| 2022/0228935 A1 | * | 7/2022 | Okuyama | ............... G01L 3/102 |

FOREIGN PATENT DOCUMENTS

| | | | |
|---|---|---|---|
| CN | 205373623 U | * | 7/2016 |
| JP | 06-221940 A | | 8/1994 |
| JP | 2020101502 A | * | 7/2020 |

* cited by examiner

*Primary Examiner* — Max H Noori
(74) *Attorney, Agent, or Firm* — Thomas W. Cole; Calderon Safran & Cole P.C.

(57) ABSTRACT

A magnetostrictive torque sensor includes detection coils formed around a magnetostrictive material made of chrome steel or chrome molybdenum steel, a magnetic ring configured to cover around the detection coils, and a drive unit for providing alternating current excitation to the detection coils at an excitation frequency of 50 kHz or more and 333 kHz or less. A torque applied to the magnetostrictive material is detected based on a change in inductance of the detection coils. The magnetic ring is configured by wrapping around the detection coils with an amorphous tape made of amorphous soft magnetic material in a tape shape. The thickness of the magnetic ring is 1.455 times or more as thick as a skin effect thickness of the magnetostrictive material and less than 1.000 mm.

5 Claims, 7 Drawing Sheets

MAGNETOSTRICTIVE TORQUE SENSOR AND DESIGN METHOD OF THICKNESS OF MAGNETIC RING FOR MAGNETOSTRICTIVE TORQUE SENSOR

CROSS-REFERENCE TO RELATED APPLICATIONS

The present patent application claims the priority of Japanese patent application No. 2021-013906 filed on Jan. 29, 2021, and the entire contents of Japanese patent application No. 2021-013906 are hereby incorporated by reference.

TECHNICAL FIELD

The present invention relates to a magnetostrictive torque sensor and a design method of thickness of a magnetic ring for a magnetostrictive torque sensor.

BACKGROUND ART

A conventional magnetostrictive torque sensor is known, which uses a magnetostrictive material having magnetostrictive characteristics in which magnetic permeability changes when a torque (rotational torque) is applied, and the sensor is configured that a change in the magnetic permeability of the magnetostrictive material when the torque is applied is detected as a change in inductance of a detection coil and the torque applied to the magnetostrictive material is thereby detected.

In such a magnetostrictive torque sensor, in general, magnetic reluctance of a magnetic circuit is reduced so that a magnetic ring of a magnetic body is formed to cover around a detection coil in order to suppress a decrease in sensitivity caused by leakage of a magnetic flux to the outside. As the magnetic ring, a powder magnetic core (dust core) formed by press molding magnetic particles having insulation coating is generally used.

As a prior art document related to the invention of the present application, Patent Literature 1 is available.

PRIOR ART DOCUMENTS

Patent Literatures

Patent Literature 1: JP H6-221940A

SUMMARY OF THE INVENTION

However, when using a powder magnetic core as a magnetic ring, it is necessary to make the thickness of the magnetic ring 1 mm to 2 mm or more to get sufficient effects, and thus it is difficult to downsize a magnetostrictive torque sensor. To allow installation even in small space, it is preferable to achieve a downsized magnetostrictive torque sensor by making a magnetic ring as thin as possible.

Therefore, the object of the present invention is to provide a downsizable magnetostrictive torque sensor and a design method of thickness of a magnetic ring for a magnetostrictive torque sensor.

So as to achieve the above object, one aspect of the invention provides a magnetostrictive torque sensor comprising:
  detection coils formed around a magnetostrictive material made of chrome steel or chrome molybdenum steel;
  a magnetic ring configured to cover around the detection coils; and
  a drive unit for providing alternating current excitation to the detection coils at an excitation frequency of 50 kHz or more and 333 kHz or less,
  wherein a torque applied to the magnetostrictive material is detected based on a change in inductance of the detection coils,
  wherein the magnetic ring is configured by wrapping around the detection coils with an amorphous tape made of amorphous soft magnetic material in a tape shape, and
  wherein a thickness of the magnetic ring is 1.455 times or more as thick as a skin effect thickness of the magnetostrictive material and less than 1.000 mm.

Further, another aspect of the invention provides a magnetostrictive torque sensor comprising:
  detection coils formed around a magnetostrictive material made of chrome steel or chrome molybdenum steel;
  a magnetic ring configured to cover around the detection coils; and
  a drive unit for providing alternating current excitation to the detection coils at an excitation frequency of 50 kHz or more and 250 kHz or less,
  wherein a torque applied to the magnetostrictive material is detected based on a change in inductance of the detection coils,
  wherein the magnetic ring is configured by wrapping around the detection coils with an amorphous tape made of amorphous soft magnetic material in a tape shape, and
  wherein a thickness of the magnetic ring is 1.261 times or more as thick as a skin effect thickness of the magnetostrictive material and less than 1.000 mm.

Still further, a still another aspect of the invention provides a magnetostrictive torque sensor comprising:
  detection coils formed around a magnetostrictive material made of chrome steel or chrome molybdenum steel;
  a magnetic ring configured to cover around the detection coils; and
  a drive unit for providing alternating current excitation to the detection coils at an excitation frequency of 50 kHz or more and 200 kHz or less,
  wherein a torque applied to the magnetostrictive material is detected based on a change in inductance of the detection coils,
  wherein the magnetic ring is configured by wrapping around the detection coils with an amorphous tape made of amorphous soft magnetic material in a tape shape, and
  wherein a thickness of the magnetic ring is 1.128 times or more as thick as a skin effect thickness of the magnetostrictive material and less than 1.000 mm.

Furthermore, a further aspect of the invention provides a design method of thickness of a magnetic ring for a magnetostrictive torque sensor, the magnetostrictive torque sensor comprising:
  detection coils formed around a magnetostrictive material made of chrome steel or chrome molybdenum steel;
  a magnetic ring configured to cover around the detection coils;
  a drive unit for providing alternating current excitation to the detection coils at an excitation frequency of 50 kHz or more and 333 kHz or less,
  wherein a torque applied to the magnetostrictive material is detected based on a change in inductance of the detection coils, wherein the magnetic ring is configured by wrapping around the detection coils with an amorphous tape made of amorphous soft magnetic material in a tape shape, the design method comprising:

calculating skin effect thickness of the magnetostrictive material based on excitation frequency of the drive unit and magnetic permeability of the magnetostrictive material; and deciding a thickness of the magnetic ring to be 1.455 times or more as thick as a skin effect thickness of the magnetostrictive material and less than 1.000 mm.

Effect of the Invention

According to the present invention, it is possible to provide a downsizable magnetostrictive torque sensor and a design method of thickness of a magnetic ring for a magnetostrictive torque sensor.

BEST MODE FOR CARRYING OUT THE INVENTION

Embodiment

The embodiment of the present invention will be explained below in conjunction with appended drawings.

Figure 1:
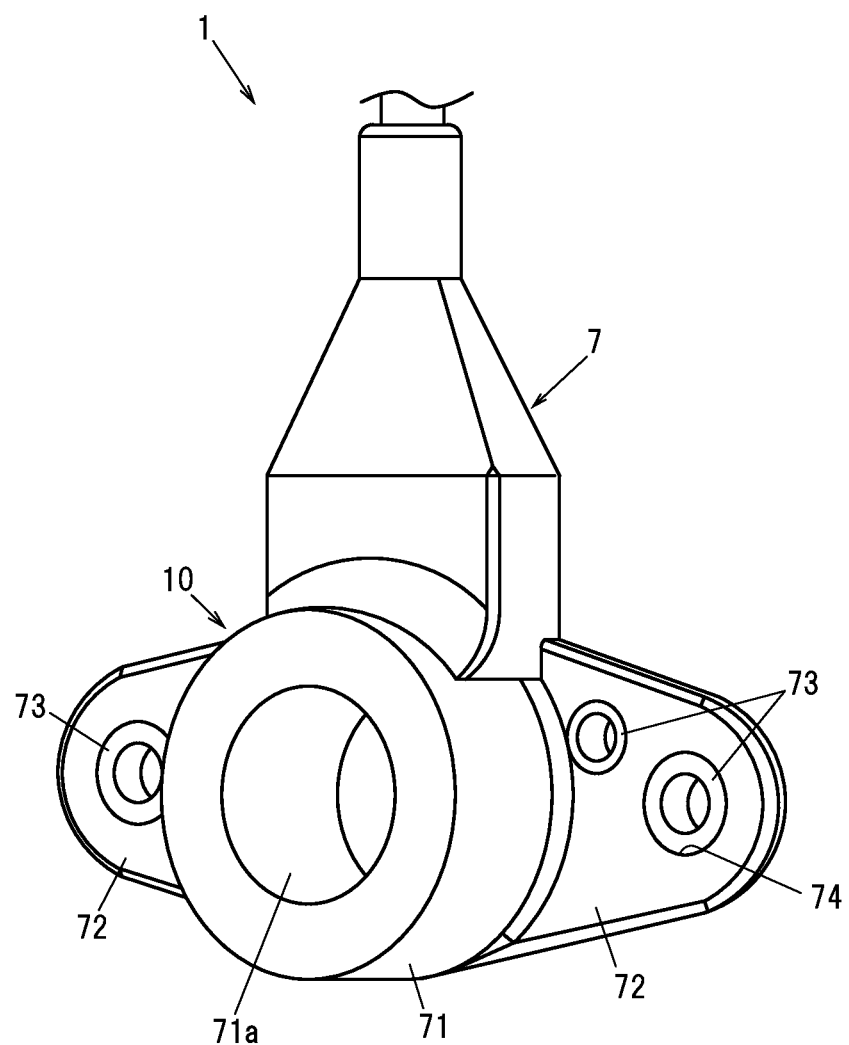
FIG. 1 is a perspective view of an external appearance of a magnetostrictive torque sensor in an embodiment of the present invention.
Figure 2A:
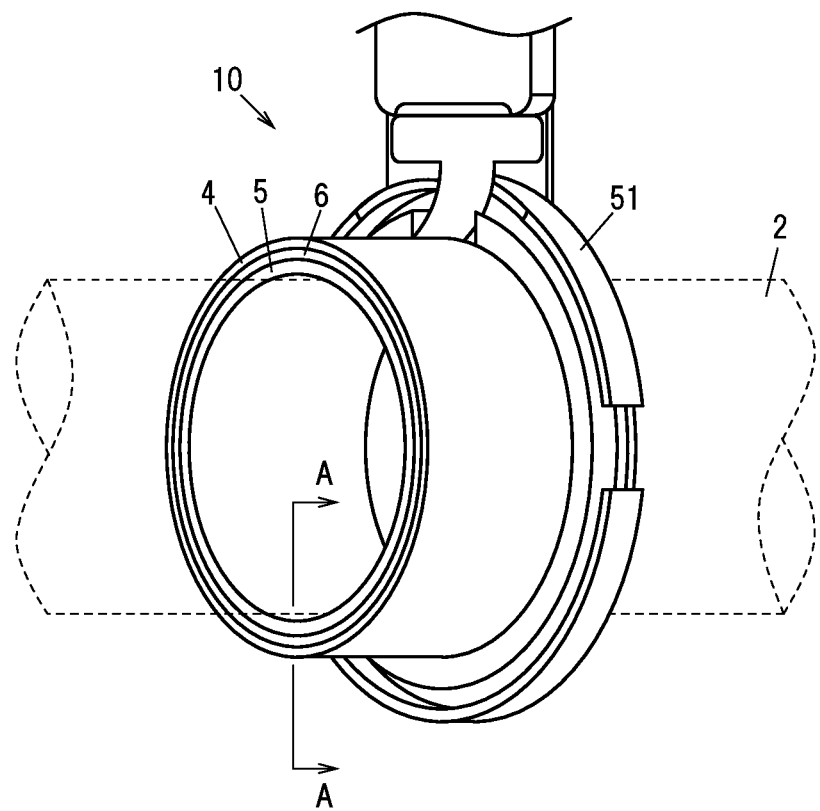
FIG. 2A is a perspective view omitting a resin mold section from FIG. 1.
Figure 2B:
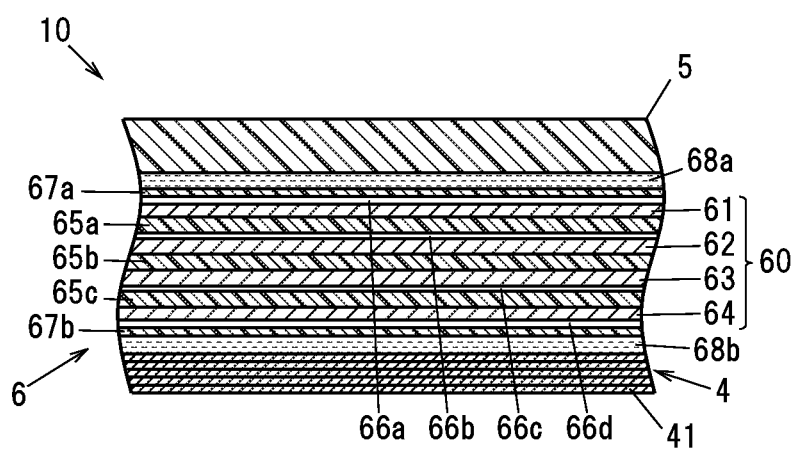
FIG. 2B is a cross-section view of a flexible substrate and a laminate structure of a magnetic ring.
Figure 3:
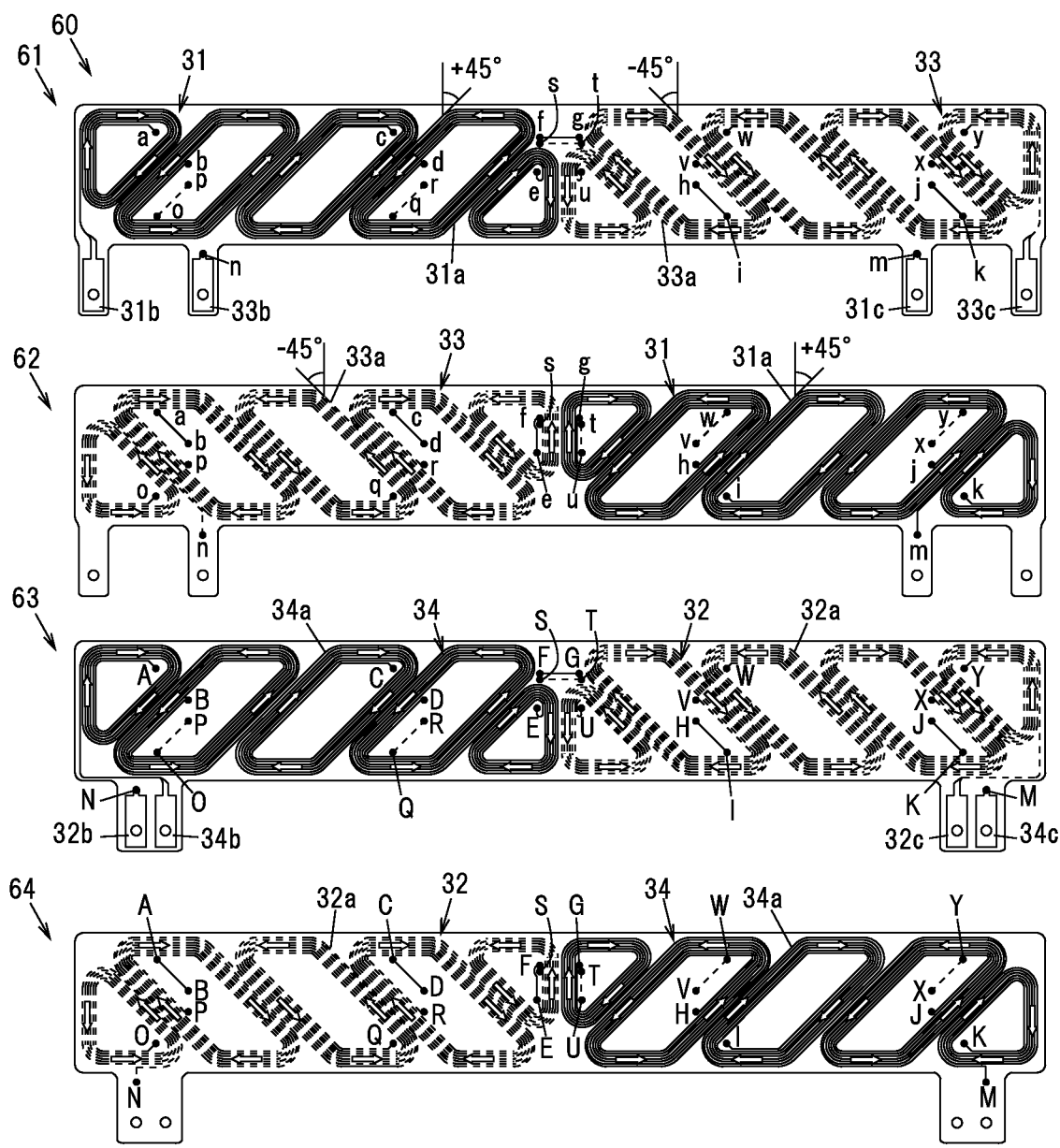
FIG. 3 is an example of wiring patterns which are configured on each of wiring layers on the flexible substrate.
Figure 4A:
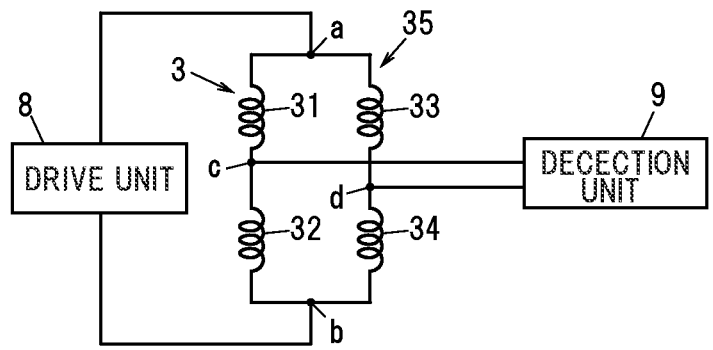
FIG. 4A is a circuit diagram of a drive unit of the torque sensor of FIG. 1, and FIGS. 413 and 4C are modification examples of the drive unit.
Figure 4B:
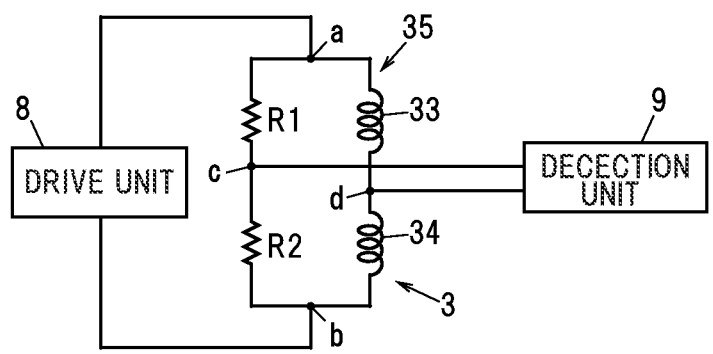
Figure 4C:
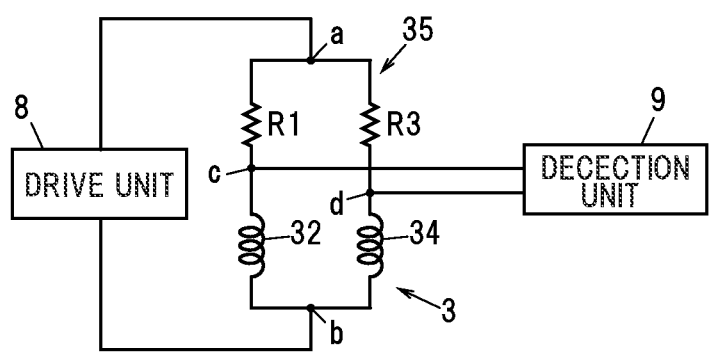

FIG. 1 is a perspective view of an external appearance of a magnetostrictive torque sensor in an embodiment of the present invention. FIG. 2A is a perspective view omitting a resin mold section from FIG. 1, and FIG. 2B is a cross-section view of a flexible substrate and a laminate structure of a magnetic ring. FIG. 3 is an example of wiring patterns which are configured on each of wiring layers on a flexible substrate. FIG. 4A is a circuit diagram of a drive unit of the torque sensor of FIG. 1, and FIGS. 4B and 4C are modification examples of the drive unit.

(Magnetostrictive Material 2)

As shown in FIG. 1 to FIG. 4C, a magnetostrictive torque sensor (hereinafter, simply referred to as "torque sensor") 1 is a sensor configured to detect a torque (a rotational torque) applied to a magnetostrictive material 2, and it is installed around the magnetostrictive material 2.

As the magnetostrictive material 2, for example, a base material made of chrome steel containing chrome such as chrome steel, chrome molybdenum steel, or nickel chromium molybdenum steel is used after it is performed shot peening following carburizing, quenching, and tempering. In the present embodiment, chrome steel SCR420H or chrome molybdenum steel SCM420H is used as the magnetostrictive material 2.

Mechanical strength, including toughness, of the magnetostrictive material 2 can be enhanced by carburizing, quenching, and tempering. Meanwhile, by performing shot peening after carburizing, quenching, and tempering, it is possible to cause martensitic transformation (diffusionless transformation) to occur on the surface and thereby possible to reduce non-magnetic austenite and increase ferromagnetic martensite. As a result, a change in magnetic permeability when stress is applied becomes large due to a decrease in the non-magnetic region and an increase in the magnetic region on the surface of the magnetostrictive material 2, plastic deformation decreases, and hysteresis due to stress fluctuation thus can be reduced.

The magnetostrictive material 2 is a columnar part to which a torque is applied in a circumferential direction. The magnetostrictive material 2 of the torque sensor 1 is, e.g., a shaft used to transfer torque in a powertrain system of a vehicle, or a shaft used to transfer torque of engine in a vehicle.

(Sensor Unit 10)

The torque sensor 1 is equipped with a sensor unit 10 covering around the magnetostrictive material 2, The sensor unit 10 has detection coils 3 formed around the magnetostrictive material 2, and a magnetic ring (magnetic body ring, back yoke) 4 formed to cover around the detection coils 3. In the present embodiment, the sensor unit 10 has four detection coils 31 to 34, i.e., first to fourth detection coils 31 to 34.

As shown in FIG. 1 and FIG. 2A, the sensor unit 10 has a bobbin 5 in a columnar shape installed to the same axis distantly from the magnetostrictive material 2, a flexible substrate 6 coiling around the outer surface of the bobbin 5, and a resin mold section 7. In the present embodiment, the detection coils 3 is composed of wiring patterns (wiring layer 60 mentioned below) configured on the flexible substrate 6. The bobbin 5 is made of non-magnetic body such as resin or the like, and it has a guard 51 projecting outward in a radial direction configured on an end part relative to an axial direction. A magnetic ring 4 is configured to cover around the flexible substrate 6.

(Resin Mold Section 7)

As shown in FIG. 1, the resin mold section 7 is configured to protect the flexible substrate 6 and the magnetic ring 4, so it is formed by molding resin to cover around the bobbin 5, the flexible substrate 6, and the magnetic ring 4. The resin mold section 7 has in one body a main part 71 which covers around the bobbin 5, the flexible substrate 6, and the magnetic ring 4, and a flange 72 which is projecting outward from the main part 71. The main part 71 has a penetration hole 71a which allows the magnetostrictive material 2 to penetrate. On the flange 72, support holes 74 are configured to support collars 73 made of metal in a short columnar shape. The flange 72 is fixed to surrounding parts (parts which are not rotated with the magnetostrictive material 2) by using bolts or the like.

(Flexible Substrate 6, Detection Circuit 3)

As shown in FIG. 2B, a flexible substrate 6 has wiring layers 60 made of four layers, that is, a first wiring layer 61, a second wiring layer 62, a third wiring layer 63, and a fourth wiring layer 64. However, the number of layers in the wiring layers 60 is not limited to thereto, so it can be two layers or more.

The first wiring layer 61 is configured on the surface of first base resin layer 65a made of polyimide, and the other side of the first base resin layer 65a is adhered to the second wiring layer 62 by way of an adherent layer 66b. The surface of the first wiring layer 61 is insulated by configuring the first coverlay layer 67a made of polyimide by way of an adherent layer 66a. Double-faced tape 68a is adhered onto the surface of the first coverlay layer 67a, and the flexible substrate 6 is adhered to the bobbin 5 by way of an adherent layer 66a.

The second wiring layer 62 is formed on the surface of the second base resin layer 65b made of polyimide, and the third wiring layer 63 is formed on the other side of the second base resin layer 65b.

The fourth wiring layer 64 is formed on the other side of third base resin layer 65c made of polyimide, and the surface of the third base resin layer 65c is adhered to the third wiring layer 63 by way of an adherent layer 66c. The surface of the fourth wiring layer 64 is insulated by configuring second coverlay layer 67b made of polyimide by way of an adherent layer 66d.

A double-faced tape 68b is adhered onto the surface of the second coverlay layer 67b, and the flexible substrate 6 and the magnetic ring 4 are adhered to each other by way of the double-faced tape 68b.

The second wiring layer 62 and the third wiring layer 63 that are inner layers of the flexible substrate 6, are made of rolled copper foil. The first wiring layer 61 and the fourth wiring layer 64 that are outer layers of the flexible substrate 6, are made of copper-plated electrolytic copper foil. The details are explained below, but since a via hole (through hole) needs to be configured on the flexible substrate 6 of the torque sensor 1, the first wiring layer 61 and the fourth wiring layer 64 that are the outer layers, are copper-plated.

FIG. 3 is an example of wiring patterns configured on each of the wiring layers 60 of the flexible substrate 6. FIG. 3 schematically shows wiring patterns on each of the wiring layers 60, opening the flexible substrate 6 as a flat surface.

As shown in FIG. 3, the first to fourth detection coils 31-34, are configured on the wiring layers 60 of the flexible substrate 6. The first and the fourth detection coils 31 and 34 have first straight parts 31a and 34a that are inclined at a predetermined angle relative to an axial direction of the magnetostrictive material 2, and the second and third detection coils 32 and 33 have second straight parts 32a and 33a that are inclined at predetermined angle in the opposite direction of the first straight parts 31a and 34a relative to an axial direction of the magnetostrictive material 2.

In the torque sensor 1, a change in magnetic permeability when a torque is applied to the magnetostrictive material 2, is the largest at ±45 degrees relative to an axial direction. Therefore, the detection sensitivity can be improved by configuring the first straight parts 31a and 34a so as to be inclined at ±45 degrees relative to the axial direction, and the second straight parts 32a and 33a so as to be inclined at −45 degrees relative to the axial direction.

In the present torque sensor 1, wiring patterns of the wiring layers 60 that configure the first detection coil 31 and wiring patterns of the wiring layers 60 that configure the third detection coil 33 are partially exchanged, and the first and third detections coils 31 and 33 are configured over the wiring layers 60 of two layers (the first and second wiring layers 61, 62). In the same manner, the wiring patterns of the wiring layers 60 that configure the second detection coil 32 and the wiring patterns of the wiring layers 60 that configure the fourth detection coil 34 are partially exchanged, and the second and fourth detections coils 32 and 34 are configured over the wiring layers 60 of two layers (the third and fourth wiring layers 63, 64). The wiring layers 60 are electrically connected one another by via holes.

By forming each of the detection coils 3 over the wiring layers 60 of two layers, the impact of characteristic difference between the two layers of the wiring layers 60 can be controlled. As a result, measurement errors due to the characteristic difference between the wiring layers 60 can be controlled and the measurement accuracy can be improved.

In the present embodiment, the wiring patterns configured on the first wiring layer 61 and the third wiring layer 63, and on the second wiring layer 62 and the fourth wiring layer 64, are substantially the same patterns. Also, electric currents applied to the wiring patterns configured on the first wiring layer 61 and the third wiring layer 63, and on the second wiring layer 62 and the fourth wiring layer 64, are in the same direction. The directions of electric currents are indicated by open arrows in FIG. 3. Additionally, in FIG. 3, the input-side electrodes of the first to fourth detection coils 31-34 are respectively denoted by the reference numerals 31b, 32b, 33b, and 34b, and the output-side electrodes are respectively denoted by the reference numerals 31c, 32c, 33c, and 34e. Also, reference alphabets "a" to "y" and "A" to "Y" in FIG. 3 show for convenience the connection relationship by via holes, that is, the parts denoted by the same alphabets are electrically connected by via holes. Note that the wiring patterns of the wiring layers 60 in FIG. 3 are examples, and that a practical structure of the wiring patterns is not limited to thereto.

(Bridge Circuit 35, Drive Unit 8, Detection Unit 9)

As shown in FIG. 4A, a bridge circuit 35 is configured by connecting four detection coils in bridge connection in the present embodiment. The bridge circuit 35 comprises the first detection coil 31 and the second detection coil 32 in series connection, the third detection coil 33 and the fourth detection coil 34 in series connection, and the first and second detection coils 31, 32 and the third and fourth detection coils 33, 43 in parallel connections. The first to fourth detection coils 31-34 are formed to have the same number of turns and substantially the same impedance.

The torque sensor 1 has a drive unit 8 for providing alternating current excitation to the detection coils 3, The drive unit 8 applies AC voltage between a contact a, which is between the first detection coil 31 and the third detection coil 33, and a contact b, which is between the second detection coil 32 and the fourth detection coil 34, of the bridge circuit 35.

Also, the torque sensor 1 has a detection unit 9 for measuring voltage between a contact c, which is between the first detection coil 31 and the second detection coil 32, and a contact d, which is between the third detection coil 33 and the fourth detection coil 34, of the bridge circuit 35. The detection unit 9 is built into a microcomputer or a personal computer (PC), with an appropriate combination of a CPU, software, memory, interfaces or the like.

When the drive unit 8 applies AC voltage between the contacts a and b, the AC voltage provides alternating current excitation to the first to fourth detection coils 31-34 and a magnetic flux is generated. The first to forth detection coils 31-34 are configured around the magnetostrictive material 2 where stress is measured, the magnetic flux generated by the first to fourth detection coils 31-34 passes through the magnetostrictive material 2. Since the magnetic permeability of the magnetostrictive material 2 changes when a torque is applied (rotational torque), impedance (inductance) of each of the detection coils 3 changes according to a given torque, and thus, voltage detected by the detection unit 9 changes. The detection unit 9 detects a torque applied to the magnetostrictive material 2 based on the detected voltage. As explained above, the torque sensor 1 is configured to detect a torque applied to the magnetostrictive material 2 based on a change in inductance of the detection coils 3.

In the above description, a case where four detection coils 3 are used has been explained, but the first and second coils 31, 32 can be replaced by resistances R1 and R2 and only the third and fourth detection coils 33, 34 can be used as shown in FIG. 413. In the same manner, the third and fourth detection coils 33, 34 can be replaced by the resistances, and the first and second detection coils 31, 32 can be used. Also, as shown in FIG. 4C, the first and third detection coils 31, 33 can be replaced by resistances R1 and R3 and only two detection coils, the second and fourth detection coils 32, 34, can be used. In the same manner, the second and fourth detection coils 32, 34 can be replaced by the resistances and only the first and third detection coils 31, 33 can be used.

Additionally, even in a case where four detection coils 3 are used, only a part of the detection coils 3 can be formed around the magnetostrictive material 2. For example, only the first and second detection coils 31, 32 can be formed around the magnetostrictive material 2, or only the third and fourth detection coils 33, 34 can be formed around the magnetostrictive material 2. Also, only the first and third detection coils 31, 33 can be formed around the magnetostrictive material 2, or only the second and fourth detection coils 32, 34 can be formed around the magnetostrictive material 2. In other words, at least two of the first to fourth detection coils 31-34 need to be formed around the magnetostrictive material 2. Also, a part of the detection coils 3 that is not formed around the magnetostrictive material 2, can be, e.g., formed on a body other than the magnetostrictive material 2 and configured around the magnetostrictive material 2 for reference to which an external force (stress) is not applied.

Additionally, in the present embodiment, a case where the detection coils 3 are formed on the wiring layers 60 of the flexible substrate 6, but the configuration is not limited to thereto, e.g., the detection coils 3 can be formed by coiling an insulation wire around the bobbin 5, or the detection coils 3 can be formed by directly wiring an insulation wire around the magnetostrictive material 2.

(Magnetic Ring 4)

A conventional powder magnetic core has been widely used as the magnetic ring 4, but to use a powder magnetic ring as the magnetic ring 4, the thickness of the magnetic ring 4 becomes as thick as 1 mm or more, and thus, the size of the sensor unit 10 becomes larger. Therefore, in the present embodiment, an amorphous tape (amorphous alloy band) 41 made of soft magnetic material in a tape shape is used as the magnetic ring 4. The magnetic ring 4 is configured by coiling the amorphous tape 41 around the flexible substrate 6 (the detection coils 3).

In the present embodiment, as the amorphous tape 41 used for the magnetic ring 4, a tape made of an iron-based amorphous alloy or a cobalt-based amorphous alloy is used. As an iron-based amorphous alloy, Metglas (registered trademark, hereinafter omitted) 2605SA1 of Hitachi. Metals Ltd. (composition: Fe—Si—B, thickness: 25 μm) is used. As a cobalt-based amorphous alloy, Metglas 2705M of Hitachi Metals Ltd. (composition: Co—Fe—Ni—Si—B—Mo, thickness: 22 μm) is used.

In the torque sensor 1 according to the present embodiment, the thickness of the magnetic ring 4 is 0.075 mm or more and less than 1.000 mm. The reason is explained below.

The torque sensor 1 with different thickness of the magnetic ring 4 was produced experimentally, and errors (total values of hysteresis errors and angle-dependent errors) and sensor sensitivity were measured while changing excitation frequency (frequency of AC voltage to apply) of the drive unit 8 in 50 kHz or more and 333 kHz or less. As the amorphous tape 41, an iron-based amorphous alloy, Metglas 2605SA1 (composition; Fe—Si—B, thickness: 25 μm) was used. Also, as the magnetostrictive material 2, the base material made of chrome steel SCR420H that was performed shot peening after carburizing, quenching, and tempering was used. The measurement results are shown in FIGS. 5A and 5B.

Figure 6A:
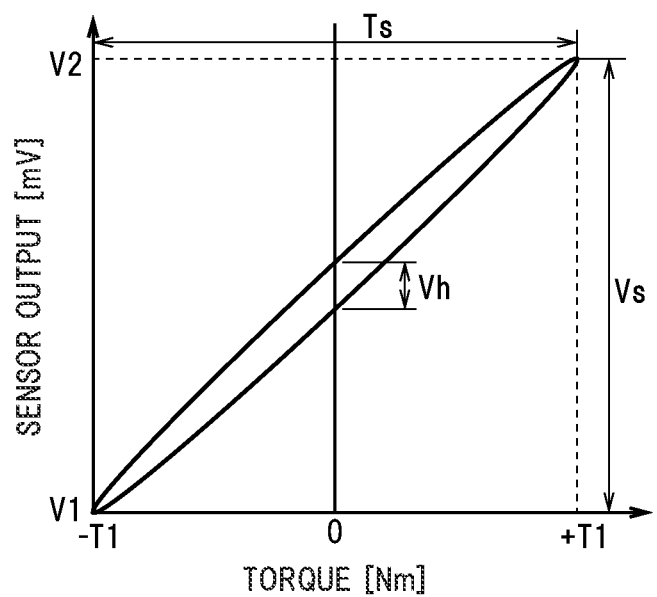
FIG. 6A is a diagram explaining sensor sensitivity and hysteresis error.

The sensor sensitivity here is, as shown in FIG. 6A, calculated by dividing sensor output V (mV) by torque T (Nm) which is applied to the magnetostrictive material 2, and is expressed as V/T (mV/Nm). When the torque T which is applied to the magnetostrictive material 2 is −T1 or more and +T1 or less, the sensor output corresponding to the torque −T1 is represented as V1, and the sensor output corresponding to the torque +T1 is represented as V2, then the sensor sensitivity is expressed as (V2−V1)/(2×T1)=Vs/Ts. Additionally, a hysteresis error, which is also called a linearity error, is a ratio of the maximum value Vh of sensor output difference when a torque increases or decreases to the sensor output Vs (=V2−V1), and can be expressed as Vh/Vs (% FS and FS mean full scale).

Figure 6B:
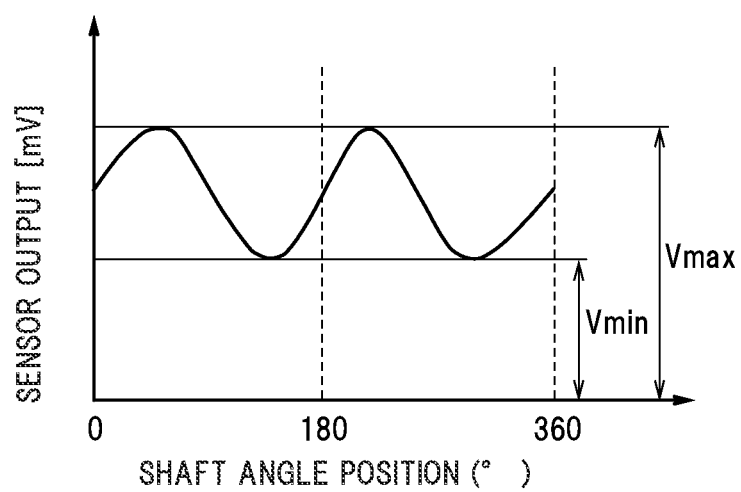
FIG. 6B is a diagram explaining angle-dependent errors.

Additionally, the angle-dependent error is an error caused by the rotation of the magnetostrictive material 2 (variation of the sensor output in circumferential direction of the magnetostrictive material 2), and as shown in FIG. 6 (*b*), is expressed as (Vmax−Vmin)/Vs (% FS) when the maximum value of the sensor output is represented as Vmax and the minimum value as Vmin. In the present embodiment, the target is to suppress errors which are total values of hysteresis errors and angle-dependent errors to 3.0% FS or less.

Figure 5A:
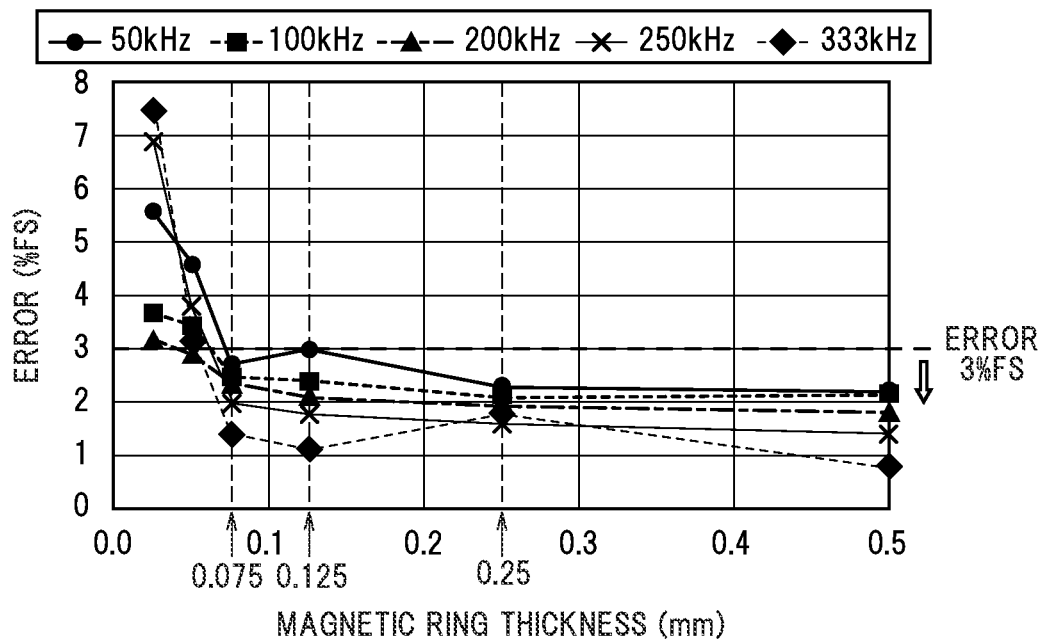
FIG. 5A is a graph showing the relationship between magnetic ring thickness and error.
Figure 5B:
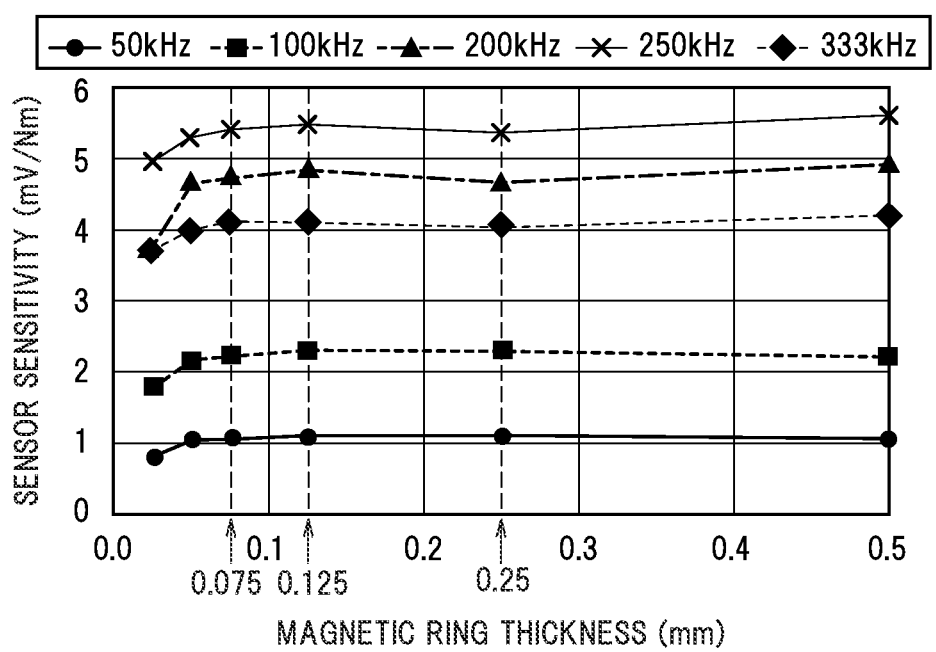
FIG. 5B is a graph showing the relationship between magnetic ring thickness and sensor sensitivity.

As shown in FIG. 5A, for either excitation frequency, it is possible to achieve the target of suppressing errors to 3.0% FS or less by making the magnetic ring 4 with the thickness of 0.075 mm or more. The tendency in a graph of FIG. 5A shows that the thicker the magnetic ring 4 is, the smaller errors are. However, if the magnetic ring 4 becomes too thick, the manufacturing cost increases and the sensor unit 10 becomes larger, thus, it is preferable that the thickness of the magnetic ring 4 is at least less than the thickness of the conventional powder magnetic core, that is, less than 1.000 mm, and it is more preferable if it is 0,500 mm or less. In other words, in the range where the excitation frequency is 50 kHz or more and 333 kHz or less, errors can be suppressed to 3% FS or less and the sensor unit 10 can be downsized than the conventional one by making the magnetic ring 4 in the thickness of 0.075 mm or more and less than 1.000 mm.

Additionally, the result in FIG. 5A shows that errors can be suppressed to 2.2% FS or less, which is a very low level, by setting the excitation frequency to 200 kHz. or more and by making the magnetic ring 4 with the thickness of 0.250 mm or more. Since the amorphous tape 41 used for the magnetic ring 4 is extremely thin, the thickness of the magnetic ring 4 can be adjusted by the number of wrapping with the amorphous tape 41. For example, in the present embodiment, the amorphous tape 41 with the thickness of 25 μm is used. By wrapping the magnetic ring 4 with the amorphous tape 41 three times, the thickness of the magnetic ring 4 becomes 0.075 mm.

The amorphous tape 41 is adhered to an outer surface of the flexible substrate 6 by the double-faced tape 68b (see FIG. 2B). When wrapping with the amorphous tape 41, it is preferable to apply appropriate tension to the amorphous tape 41 so that a gap is not created between the flexible substrate 6 and the amorphous tape 41 and between layers of the amorphous tape 41. In the present embodiment, the wrapping end of the amorphous tape 41 is fixed by resistance welding onto an outer surface of the amorphous tape 41 of a lower layer. However, not limited to thereto, the amorphous tape 41 can be fixed by temporarily fixing its wrapping end with an adherent tape or the like and by forming the resin mold section 7 on it.

Additionally, as shown in FIG. 5B, the sensor sensitivity is as low as 3 mV/Nm or less in the excitation frequency of 100 kHz or less. For improving the sensor sensitivity, it is preferable to set the excitation frequency to 200 kHz or more. However, if the excitation frequency is too high, the loss in a circuit or the like increases, so it is more preferable to set the excitation frequency to 200 kHz or more and 250 kHz or less.

Here, for comparison, the measurement of sensor sensitivity and errors were performed for comparative example 1 without a magnetic ring and comparative example 2 using a powder magnetic core with the thickness of 2 mm as a magnetic ring. The measurement results of the comparative examples 1 and 2 are shown with the measurement results of embodiment example 1 using a magnetic ring 4 with the thickness of 0.125 mm and embodiment example 2 using a magnetic ring 4 with the thickness of 0.250 mm. Also, in FIG. 7, a drive frequency was 200 kHz.

Figure 7:
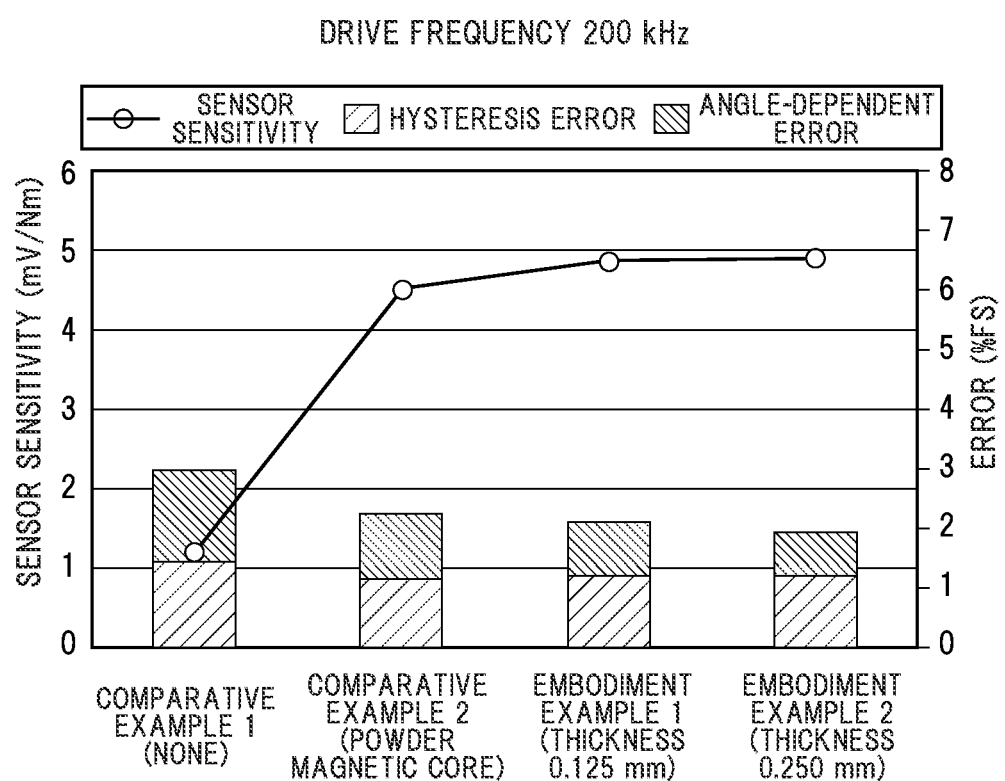
FIG. 7 is a graph showing measurement results of sensor sensitivity and error of comparative examples and embodiment examples.

As shown in FIG. 7, in the embodiment examples 1 and 2, the sensor sensitivity is improved in comparison with the comparative example 1 without a magnetic ring, and errors are suppressed as well. Also, in the embodiment examples 1 and 2, the equivalent levels of sensor sensitivity and errors to the comparative example 2 using a powder magnetic core were measured, so it is confirmed that equivalent results to the case using a powder magnetic core can be achieved, while making configuration efforts to make the magnetic ring 4 thinner in order to downsize the sensor unit 1.

(Operation and Effect of Embodiment)

As explained above, in the torque sensor according to the present embodiment, the magnetic ring 4 is configured by wrapping around the detection coils 3 with the amorphous tape 41 made of amorphous soft magnetic material in a tape shape, wherein the thickness of the magnetic ring 4 is 0.075 mm or more and less than 1.000 mm.

The configuration above allows sufficient improvement of sensor sensitivity and suppression of errors, and thus, the sensor unit 10 can be downsized while making the magnetic ring 4 extremely thin.

OTHER EMBODIMENTS

In the above embodiment, the thickness of the magnetic ring 4 is specified, but the thickness of the magnetic ring 4 can be also decided by a skin effect thickness of the magnetostrictive material 2.

When the magnetostrictive material 2 is made of chrome steel or chrome molybdenum steel, the magnetic permeability μ is $0.756 \times 10^{-4}$ to $1.004 \times 10^{-4}$ H/m. When f is the excitation frequency (Hz) and ρ is the electrical resistivity (Ω·m) of the magnetostrictive material 2, a skin effect thickness d of the magnetostrictive material 2 is expressed by the following expression (1) in Formula 1. Also, the electrical resistivity ρ is expressed by $2.1 \times 10^{-7}$ Ω·m when the magnetostrictive material 2 is made of chrome steel or chrome molybdenum steel.

[Formula 1]

$$d = \sqrt{\frac{2\rho}{2\pi f \mu}} \quad (1)$$

The expression (1) shows that when chrome steel or chrome molybdenum steel is used as the magnetostrictive material 2, the skin effect thickness d of the magnetostrictive material 2 is 0.0577 to 0.0665 mm at the excitation frequency of 200 kHz, for example. Also, when the excitation frequency is 50 kHz, the skin effect thickness d of the magnetostrictive material 2 is 0.1154 to 0.1330 mm. Therefore, in a case where the excitation frequency is 50 kHz or more and 200 kHz or less, when the thickness of the magnetic ring 4 is made 1.128 times or more as thick as the skin effect thickness d of the magnetostrictive material 2, more preferably 1.300 times or more, in other words, when the thickness of the magnetic ring 4 is approximately 0.075 mm or more, errors can be suppressed to 3% or less.

In the same manner, when the excitation frequency is 250 kHz, the skin effect thickness d of the magnetostrictive material 2 is 0.0516 to 0.0595 mm. Therefore, when the excitation frequency is 50 kHz or more and 250 kHz or less (especially more than 200 kHz and 250 kHz or less), it is preferable to make the thickness of the magnetic ring 4 1.261 times or more as thick as the skin effect thickness d of the magnetostrictive material 2, and more preferably, 1.453 times or more.

Additionally, when the excitation frequency is 333 kHz, the skin effect thickness d of the magnetostrictive material 2 is 0.0477 to 0.0515 mm. Therefore, in a case where the excitation frequency is 50 kHz or more and 333 kHz or less (especially more than 250 kHz and 333 kHz or less), it is preferable to make the thickness of the magnetic ring 4 1.455 times or more as thick as the skin effect thickness d of the magnetostrictive material 2, and more preferably, 1.677 times or more.

As explained above, when the excitation frequency is 50 kHz or more and 333 kHz or less, for designing the thickness of the magnetic ring 4, calculate the skin effect thickness d of the magnetostrictive material 2 by the expression (1), based on the excitation frequency f of the drive unit 8 and the magnetic permeability of the magnetostrictive material 2, then the thickness of the magnetic ring 4 is made 1.455 times or more, more preferably, 1.677 times or more, as thick as the calculated skin effect thickness d of the magnetostrictive material 2, errors can be suppressed to 3% FS or less. Also, even when it is decided by the skin effect thickness of the magnetostrictive material 2, it is preferable that the thickness of the magnetic ring 4 is less than 1.000 mm, and more preferably, 0.500 mm or less.

SUMMARY OF EMBODIMENTS

Next, technical ideas understood from the embodiment explained above, are described with the help of the reference numerals or the like used in the embodiment. However, the reference numerals used in the following description do not limit the components in the scope of patent application to the materials or the like that are concretely described in the embodiment.

[1] A magnetostrictive torque sensor (1) comprising:
detection coils (3) formed around a magnetostrictive material (2) made of chrome steel or chrome molybdenum steel;
a magnetic ring (4) configured to cover around the detection coils (3); and
a drive unit (8) for providing alternating current excitation to the detection coils (3) at an excitation frequency of 50 kHz or more and 333 kHz or less,
wherein a torque applied to the magnetostrictive material (2) is detected based on a change in inductance of the detection coils (3),
wherein the magnetic ring (4) is configured by wrapping around the detection coils (3) with an amorphous tape (41) made of amorphous soft magnetic material in a tape shape, and
wherein a thickness of the magnetic ring (4) is 1.455 times or more as thick as a skin effect thickness of the magnetostrictive material (2) and less than 1.000 ram.

[2] A magnetostrictive torque sensor (1) comprising:
detection coils (3) formed around a magnetostrictive material (2) made of chrome steel or chrome molybdenum steel;
a magnetic ring (4) configured to cover around the detection coils (3); and
a drive unit (8) for providing alternating current excitation to the detection coils (3) at an excitation frequency of 50 kHz or more and 250 kHz or less,
wherein a torque applied to the magnetostrictive material (2) is detected based on a change in inductance, of the detection coils (3),
wherein the magnetic ring (4) is configured by wrapping around the detection coils (3) with an amorphous tape (41) made of amorphous soft magnetic material in a tape shape, and
wherein a thickness of the magnetic ring (4) is 1.261 times or more as thick as a skin effect thickness of the magnetostrictive material (2) and less than 1.000 mm.

[3] A magnetostrictive torque sensor (1) comprising:
detection coils (3) formed around a magnetostrictive material (2) made of chrome steel or chrome molybdenum steel;
a magnetic ring (4) configured to cover around the detection coils (3); and
a. drive unit (8) for providing alternating current excitation to the detection coils (3) at an excitation frequency of 50 kHz or more and 200 kHz or less,
wherein a torque applied to the magnetostrictive material (2) is detected based on a change in inductance of the detection coils (3),
wherein the magnetic ring (4) is configured by wrapping around the detection coils (3) with an amorphous tape (41) made of amorphous soft magnetic material in a tape shape, and
wherein a thickness of the magnetic ring (4) is 1.128 times or more as thick as a skin effect thickness of the magnetostrictive material (2) and less than 1.000 mm.

[4] The magnetostrictive torque sensor according to any one of [1] to [3], wherein shot peening is performed on the magnetostrictive material (2).

[5] A design method of thickness of a magnetic ring (4) for a magnetostrictive torque sensor (1), the magnetostrictive torque sensor (1) comprising:
detection coils (3) formed around a magnetostrictive material (2) made of chrome steel or chrome molybdenum steel;
a magnetic ring (4) configured to cover around the detection coils (3);
a drive unit (8) for providing alternating current excitation to the detection coils (3) at an excitation frequency of 50 kHz or more and 333 kHz or less,
wherein a torque applied to the magnetostrictive material is detected based on a change in inductance of the detection coils (3),
wherein the magnetic ring (4) is configured by wrapping around the detection coils (3) with an amorphous tape (41) made of amorphous soft magnetic material in a tape shape,
the design method comprising:
calculating skin effect thickness of the magnetostrictive material (2) based on excitation frequency of the drive unit (8) and magnetic permeability of the magnetostrictive material (2); and
deciding a thickness of the magnetic ring (4) to be 1.455 times or more as thick as a skin effect thickness of the magnetostrictive material (2) and less than 1,000 mm.

The above is all the explanation of an embodiment of the present invention, but the embodiment explained above does not limit the invention according to the patent application. Also, note that not all the combinations of characteristics explained in the embodiment are necessary for solving the problem of the invention. The present invention can be embodied in other forms appropriately as long as its original object is maintained.

The invention claimed is:

1. A magnetostrictive torque sensor comprising:
detection coils formed around a magnetostrictive material made of chrome steel or chrome molybdenum steel;
a magnetic ring configured to cover around the detection coils; and
a drive unit for providing alternating current excitation to the detection coils at an excitation frequency of 50 kHz or more and 333 kHz or less,
wherein a torque applied to the magnetostrictive material is detected based on a change in inductance of the detection coils,
wherein the magnetic ring is configured by wrapping around the detection coils with an amorphous tape made of amorphous soft magnetic material in a tape shape, and
wherein a thickness of the magnetic ring is 1.455 times or more as thick as a skin effect thickness of the magnetostrictive material and less than 1.000 mm.

2. The magnetostrictive torque sensor according to claim 1, wherein the excitation frequency is 50 kHz or more and 250 kHz or less, and wherein the thickness of the magnetic ring is 1.261 times or more as thick as the skin effect thickness of the magnetostrictive material.

3. The magnetostrictive torque sensor according to claim 1, wherein the excitation frequency is 50 kHz or more and 200 kHz or less, and wherein the thickness of the magnetic ring is 1.128 times or more as thick as the skin effect thickness of the magnetostrictive material.

4. The magnetostrictive torque sensor according to claim 1, wherein shot peening is performed on the magnetostrictive material.

5. A design method of thickness of a magnetic ring for a magnetostrictive torque sensor, the magnetostrictive torque sensor comprising:

detection coils formed around a magnetostrictive material made of chrome steel or chrome molybdenum steel;

a magnetic ring configured to cover around the detection coils;

a drive unit for providing alternating current excitation to the detection coils at an excitation frequency of 50 kHz or more and 333 kHz or less, wherein a torque applied to the magnetostrictive material is detected based on a change in inductance of the detection coils, wherein the magnetic ring is configured by wrapping around the detection coils with an amorphous tape made of amorphous soft magnetic material in a tape shape, the design method comprising:

calculating skin effect thickness of the magnetostrictive material based on excitation frequency of the drive unit and magnetic permeability of the magnetostrictive material; and deciding a thickness of the magnetic ring to be 1,455 times or more as thick as a skin effect thickness of the magnetostrictive material and less than 1.000 mm.

\* \* \* \* \*